United States Patent
Lee et al.

(10) Patent No.: US 10,474,546 B1
(45) Date of Patent: Nov. 12, 2019

(54) OCULINK ELECTRONIC DEVICE HAVING FLEXIBLE CIRCUIT BOARD

(71) Applicant: APACER TECHNOLOGY INC., New Taipei (TW)

(72) Inventors: Jiunn-Chang Lee, New Taipei (TW); Chien-Pang Chen, New Taipei (TW)

(73) Assignee: APACER TECHNOLOGY INC., New Taipei (TW)

( * ) Notice: Subject to any disclaimer, the term of this patent is extended or adjusted under 35 U.S.C. 154(b) by 0 days.

(21) Appl. No.: 16/106,941

(22) Filed: Aug. 21, 2018

(30) Foreign Application Priority Data

Jul. 4, 2018 (TW) .............................. 107123210 A

(51) Int. Cl.
G06F 11/20 (2006.01)
G06F 13/38 (2006.01)
G06F 13/40 (2006.01)
H01R 12/79 (2011.01)

(52) U.S. Cl.
CPC ........ *G06F 11/2015* (2013.01); *G06F 13/385* (2013.01); *G06F 13/409* (2013.01); *G06F 13/4068* (2013.01); *H01R 12/79* (2013.01); *G06F 2213/0026* (2013.01)

(58) Field of Classification Search
CPC ............... G06F 11/2015; G06F 13/385; G06F 13/4068; G06F 13/409; G06F 2213/0026; H01R 12/79
USPC .... 439/76.1, 492, 493, 499, 66, 77, 31, 165, 439/640
See application file for complete search history.

(56) References Cited

U.S. PATENT DOCUMENTS

| | | | |
|---|---|---|---|
| 7,670,190 B2* | 3/2010 | Shi ......................... | H01R 24/58 439/640 |
| 2005/0047776 A1* | 3/2005 | Watanabe ................ | G02B 7/28 396/543 |
| 2010/0197368 A1* | 8/2010 | Kawate .................... | H01R 4/04 455/575.1 |
| 2013/0203292 A1* | 8/2013 | Chang ................ | H01R 13/6691 439/620.01 |
| 2017/0290184 A1* | 10/2017 | Kim ......................... | H05K 1/11 |
| 2018/0054014 A1* | 2/2018 | Logan, Jr. .............. | H01R 12/91 |
| 2018/0138613 A1* | 5/2018 | Gomez .................... | G06F 1/26 |

FOREIGN PATENT DOCUMENTS

| CN | 207009733 U | 2/2018 |
|---|---|---|
| TW | M261852 U | 4/2005 |
| TW | M360471 U | 7/2009 |
| TW | M562499 U | 6/2018 |

\* cited by examiner

Primary Examiner — Travis S Chambers
(74) Attorney, Agent, or Firm — Kirton McConkie; Evan R. Witt

(57) ABSTRACT

An oculink electronic device having a flexible circuit board includes an oculink connector, a first rigid circuit board, a second rigid circuit board and the flexible circuit board. The first rigid circuit board is connected with the oculink connector. The flexible circuit board is extended from the first rigid circuit board and the second rigid circuit board and disposed between the first rigid circuit board and the second rigid circuit board. Therefore, not only the assembling steps are reduced, but also the total length is significantly shortened. The rotatable characteristic is provided, and the space requirement of installation is reduced.

7 Claims, 5 Drawing Sheets

OCULINK ELECTRONIC DEVICE HAVING FLEXIBLE CIRCUIT BOARD

CROSS-REFERENCE TO RELATED APPLICATION

This application claims priority from Taiwan Patent Application No. 107123210, filed on Jul. 4, 2018, the entire contents of which are incorporated herein by reference for all purposes.

FIELD OF THE INVENTION

The present invention relates to an electronic device, and more particularly to an oculink electronic device having a flexible circuit board.

BACKGROUND OF THE INVENTION

In recent years, peripheral component interconnect express (PCI-E or PCIe) interfaces are widely utilized in the computer-relative fields. It has the speed fast enough to replace the internal buses of prior art. Meanwhile, PCI-E interfaces further support the hot swapping technology, and PCI-E interfaces have better portability and modularity potential.

An optical copper link (OCuLink, hereinafter "oculink") interface based on PCI-e 4.0 utilizes copper wires as the main connection intermedium and provides 8 Gb/s high bandwidth with single one channel. It supports 4 channels, which means that the total bandwidth can achieve 32 Gb/s. The volume is smaller, so that the oculink interface would provide the standard connection in the future for the miniaturization platform to connect with external devices, so that the internal scalability and external diversity can be enhanced.

However, the oculink interface still has some drawbacks. The conventional oculink interface still uses connectors and wires for connection. Not only the cost is high, but also the total length is hard to be shortened. It also causes the difficulty of installation. When a device with worse protection (e.g. an interface card without casing or a hard-disk drive that is sensitive to vibrations) is going to connect to the connector of the oculink interface, it will cause the device to be naked and suspended in the air with only the connector part, and further cause the instability of utilization.

Therefore, there is a need of providing an improved oculink electronic device having a flexible circuit board distinct from the prior art in order to solve the above drawbacks.

SUMMARY OF THE INVENTION

Some embodiments of the present invention are to provide an oculink electronic device having a flexible circuit board in order to overcome at least one of the above-mentioned drawbacks encountered by the prior arts.

The present invention provides an oculink electronic device having a flexible circuit board. By extending the flexible circuit board from the first rigid circuit board and the second rigid circuit board, not only the assembling steps are reduced, but also the total length is significantly shortened. The rotatable characteristic is provided, and the space requirement of installation is reduced.

The present invention also provides an oculink electronic device having a flexible circuit board. By disposing the electronic components on the second rigid circuit board, the versatility of the existing products can be enhanced. Moreover, through the bendable component and the first housing that can be rotated relative to the second housing, the rotational function can be implemented, the internal electronic components can be effectively protected, the stability and protectivity of the product are enhanced, and the interferences between the internal electronic components and the peripheral electronic components can be avoided.

In accordance with an aspect of the present invention, there is provided an oculink electronic device having a flexible circuit board. The oculink electronic device having a flexible circuit board includes an oculink connector, a first rigid circuit board, a second rigid circuit board and the flexible circuit board. The first rigid circuit board is connected with the oculink connector. The flexible circuit board is extended from the first rigid circuit board and the second rigid circuit board and disposed between the first rigid circuit board and the second rigid circuit board.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1B:
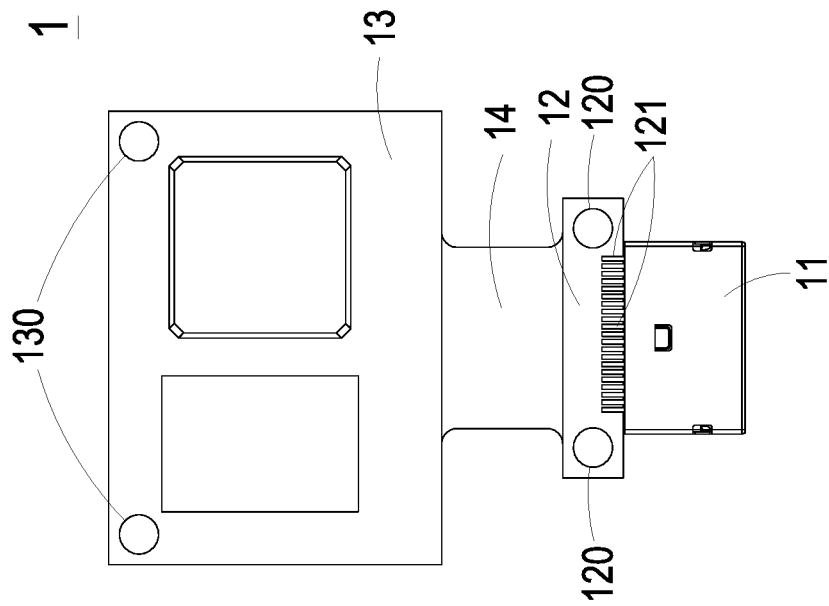
FIG. 1B schematically illustrates the top view of the oculink electronic device having a flexible circuit board shown in FIG. 1A.
Figure 1A:
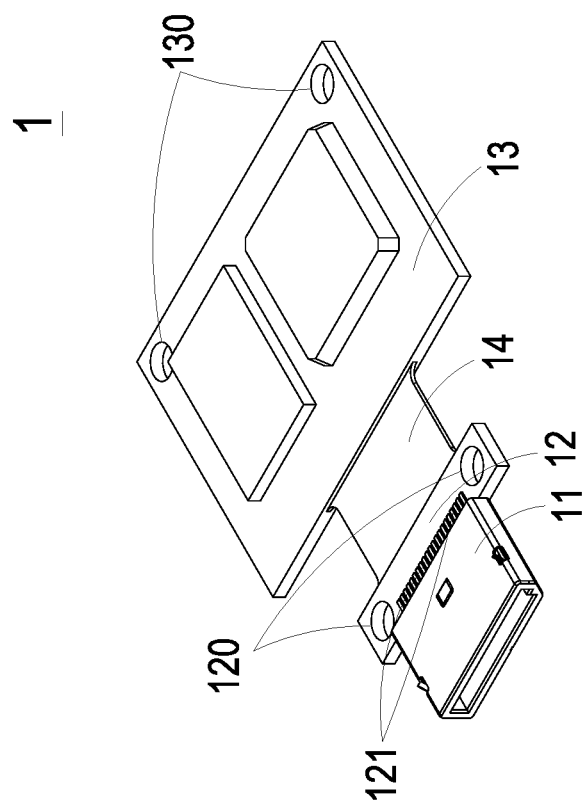
FIG. 1A schematically illustrates the structure of an oculink electronic device having a flexible circuit board according to an embodiment of the present invention.

Please refer to FIG. 1A and FIG. 1B. FIG. 1A schematically illustrates the structure of an oculink electronic device having a flexible circuit board according to an embodiment of the present invention. FIG. 1B schematically illustrates the top view of the oculink electronic device having a flexible circuit board shown in FIG. 1A. As shown in FIG. 1A and FIG. 1B, according to an embodiment of the present invention, an oculink electronic device having a flexible circuit board 1 includes an oculink connector 11, a first rigid circuit board 12, a second rigid circuit board 13 and the flexible circuit board 14. It should be noted that the oculink connector 11 herein is any one connector meets with the requirements of the oculink specification and protocol. Certainly, the oculink electronice device having a flexible circuit board 1 is also an electronic device that meets the requirements of the oculink specification and protocol. For example, the oculink connector 11 can be the Nano-pitch I/O™ produced by Molex, LLC, which has 42 pins, but not limited herein. The first rigid circuit board 12 is connected with the oculink connector 11. The flexible circuit board 14 is extended from the first rigid circuit board 12 and the second rigid circuit board 13 and disposed between the first rigid circuit board 12 and the second rigid circuit board 13.

In some embodiments, the first rigid circuit board 12, the second rigid circuit board 13 and the flexible circuit board 14 can be manufactured through the same manufacturing process of a printed circuit board (hereinafter "PCB"). Only circuits are printed on the flexible circuit board 14. None or only a part of the rigid plate material is stacked on the flexible circuit board 14. For example, when the first rigid circuit board 12 and the second rigid circuit board 13 are PCBs stacked by 6 layers, only the processes of 2 layers of the 6 layers are executed to implement the flexible circuit board 14 with the flexible circuits. The flexible circuit board 14 can also be called as a flexible printed circuit (FPC), but not limited herein. Therefore, since the first rigid circuit board 12, the second rigid circuit board 13 and the flexible circuit board 14 are formed together, none of an assembling is necessary. Therefore, not only the assembling steps are reduced, but also the total length is significantly shortened. The rotatable characteristic is provided, and the space requirement of installation is reduced.

In some embodiments, the first rigid circuit board 12 is connected with the oculink connector 11 through a terminal set 121 (e.g. connected with the pins of the oculink connector 11), but not limited herein.

Figure 2B:
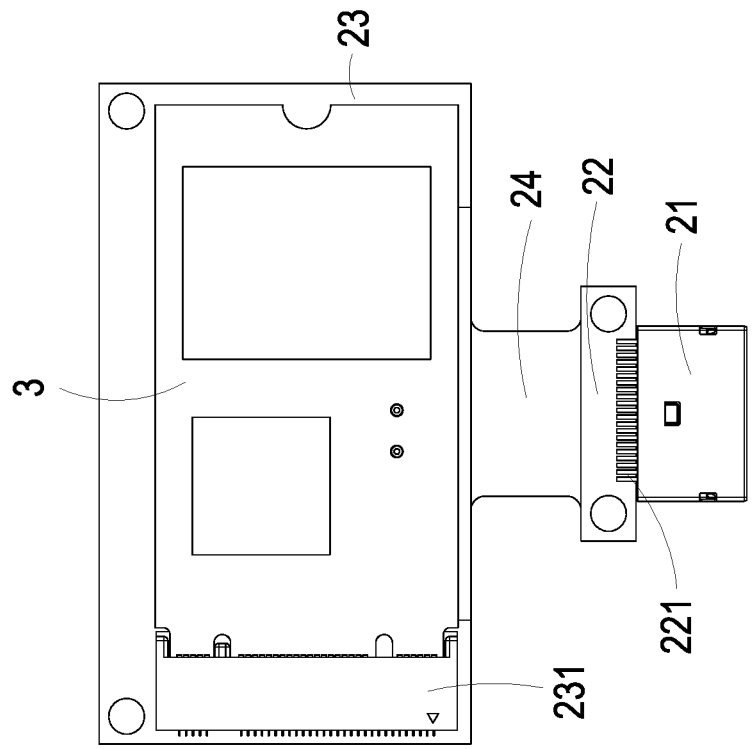
FIG. 2B schematically illustrates the top view of the oculink electronic device having a flexible circuit board shown in FIG. 2A.
Figure 2A:
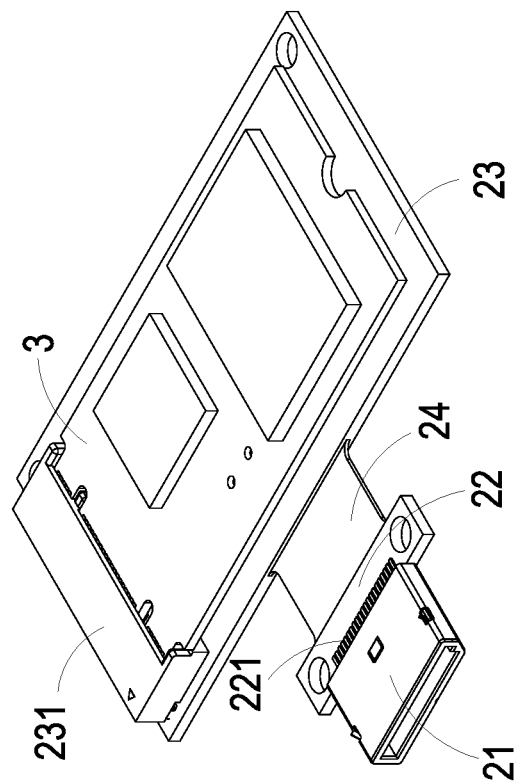
FIG. 2A schematically illustrates the structure of an oculink electronic device having a flexible circuit board according to another embodiment of the present invention.

Please refer to FIG. 2A and FIG. 2B. FIG. 2A schematically illustrates the structure of an oculink electronic device having a flexible circuit board according to another embodiment of the present invention. FIG. 2B schematically illustrates the top view of the oculink electronic device having a flexible circuit board shown in FIG. 2A. As shown in FIG. 2A and FIG. 2B, an oculink electronic device having a flexible circuit board 2 includes an oculink connector 21, a first rigid circuit board 22, a second rigid circuit board 23 and the flexible circuit board 24. The oculink connector 21, the first rigid circuit board 22 and the flexible circuit board 24 are similar with the oculink connector 11, the first rigid circuit board 12 and the flexible circuit board 14 of the embodiments mentioned above, and are not redundantly described herein. In this embodiment, the second rigid circuit board 23 includes an adapter component 231. The adapter component 231 is disposed on the second rigid circuit board 23 and connected with the oculink connector 21 through the flexible circuit board 24 and the first rigid circuit board 22. In other words, when the oculink connector 21 is connected to an apparatus to turn on the circuits, the oculink connector 21 is electrically connected with the first rigid circuit board 22, the flexible circuit board 24, the second rigid circuit board 23 and the adapter component 231 through the terminal set 221. On the other hand, the adapter component is utilized for providing the installation to an expansion device 3. The expansion device 3 is removably connected with the adapter component 231, and the expansion device 3 is removably disposed on the second rigid circuit board 23 and parallel to the second rigid circuit board 23, but not limited herein. The expansion device 3 includes but not limited to a storage unit such as a memory or a solid-state disk, or an interface card having different and special functions.

Figure 3B:
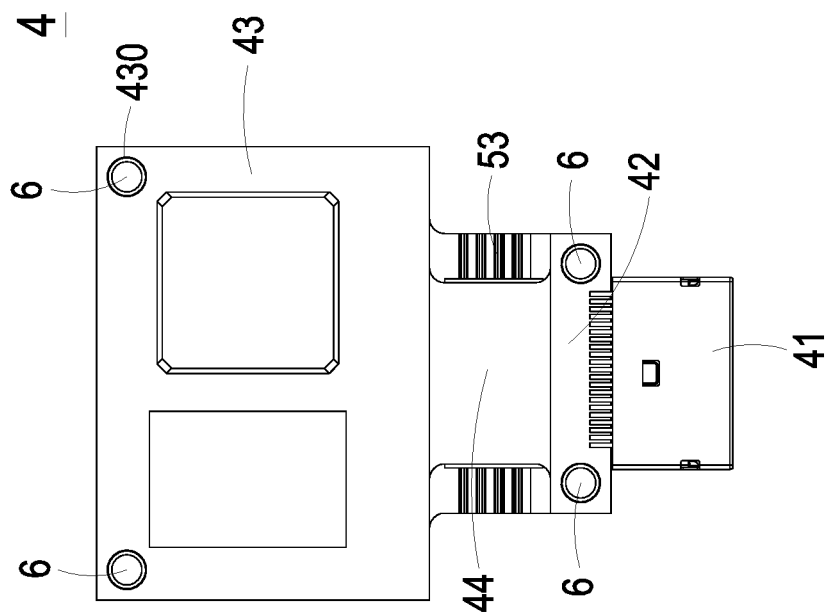
FIG. 3B schematically illustrates the top view of the oculink electronic device having a flexible circuit board shown in FIG. 3A.
Figure 3A:
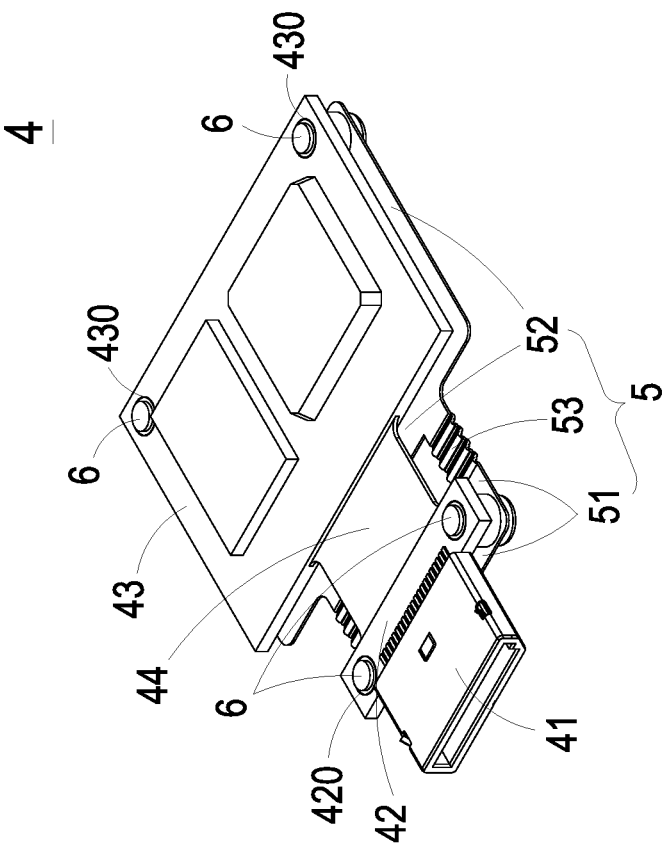
FIG. 3A schematically illustrates the structure of an oculink electronic device having a flexible circuit board according to another embodiment of the present invention.

Please refer to FIG. 3A and FIG. 3B. FIG. 3A schematically illustrates the structure of an oculink electronic device having a flexible circuit board according to another embodiment of the present invention. FIG. 3B schematically illustrates the top view of the oculink electronic device having a flexible circuit board shown in FIG. 3A. As shown in FIG. 3A and FIG. 3B, an oculink electronic device having a flexible circuit board 4 includes an oculink connector 41, a first rigid circuit board 42, a second rigid circuit board 43 and the flexible circuit board 44. The oculink connector 41, the first rigid circuit board 42, the second rigid circuit board 43 and the flexible circuit board 44 are similar with the oculink connector 11, the first rigid circuit board 12, the second rigid circuit board 13 and the flexible circuit board 14 of the embodiments mentioned above, and are not redundantly described herein. In this embodiment, the oculink electronic device having a flexible circuit board 4 further includes a bendable component 5. The bendable component 5 has a first connection portion 51, a second connection portion 52 and a bendable portion 53. The first connection portion 51 is connected with the first rigid circuit board 42. The second connection portion 52 is connected with the second rigid circuit board 43. The bendable portion 53 is connected with the first connection portion 51 and the second connection portion 52. In some embodiments, the bendable component 5 is a metal plate (e.g. an iron plate). The bendable portion 53 is wavy-shaped (e.g. a wavy-shaped iron plate), but not limited herein.

In some embodiments, the first rigid circuit board 42 of the oculink electronic device having a flexible circuit board 4 has a plurality of first openings 420, the second rigid circuit board 43 has a plurality of second openings 430, and the oculink electronic device having a flexible circuit board 4 may further include a plurality of fixing components 6. In some embodiments, the fixing components 6 are respectively penetrated through the first openings 420 and the second openings 430 for fixing the first rigid circuit board 42 with the first connection portion 51 and fixing the second rigid circuit board 43 with the second connection portion 52. The first connection portion 51 and the second connection portion 52 also can have holes corresponded to the first openings 420 and the second openings 430, but not limited thereto. In addition, the fixing components 6 can be screw components, locking components, tight components or adhesive components, but not limited thereto.

Figure 4:
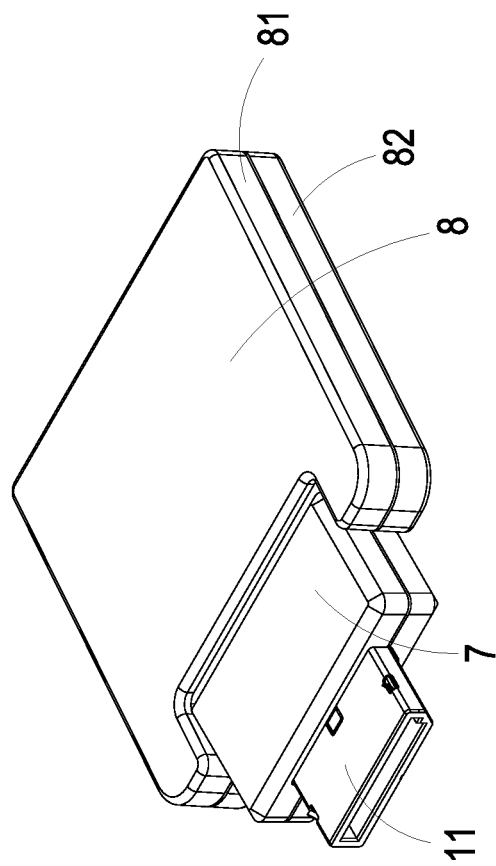
FIG. 4 schematically illustrates the structure of an oculink electronic device having a flexible circuit board and the first housing and the second housing thereof.
Figure 5B:
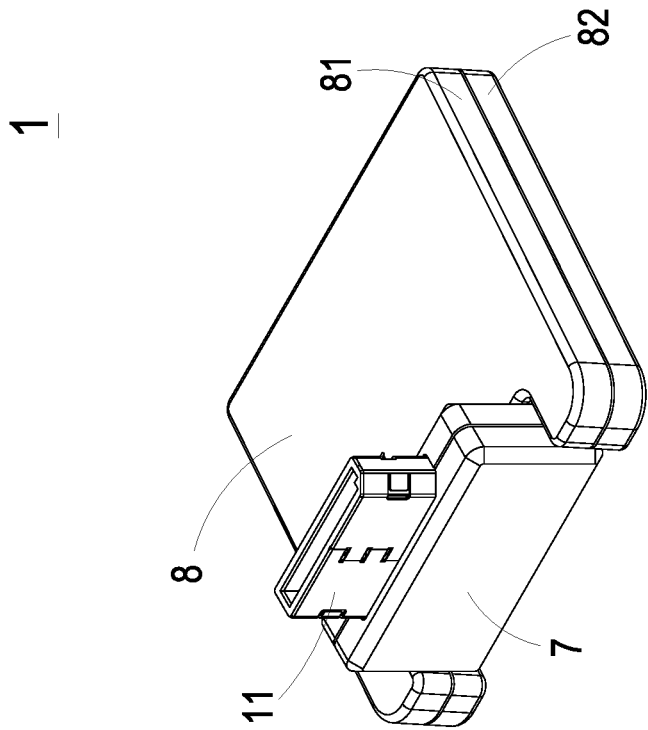
FIG. 5B schematically illustrates the structure after the first housing of the oculink electronic device having a flexible circuit board shown in FIG. 4 is rotated clockwise relative to the second housing.
Figure 5A:
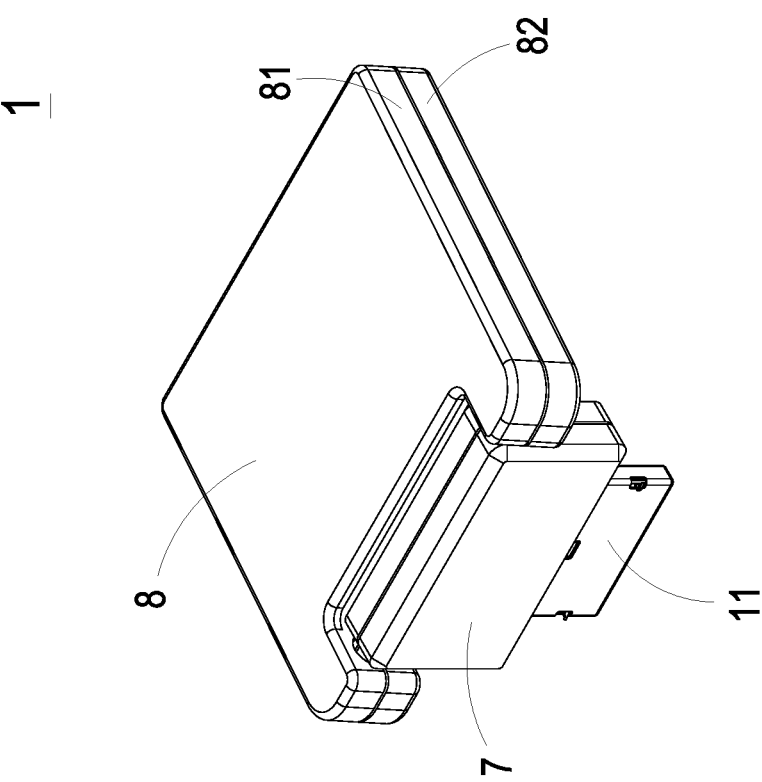
FIG. 5A schematically illustrates the structure after the first housing of the oculink electronic device having a flexible circuit board shown in FIG. 4 is rotated counter-clockwise relative to the second housing.

Please refer to FIG. 1A, FIG. 4, FIG. 5A and FIG. 5B. FIG. 4 schematically illustrates the structure of an oculink electronic device having a flexible circuit board and the first housing and the second housing thereof. FIG. 5A schematically illustrates the structure after the first housing of the oculink electronic device having a flexible circuit board shown in FIG. 4 is rotated counter-clockwise relative to the second housing. FIG. 5B schematically illustrates the structure after the first housing of the oculink electronic device having a flexible circuit board shown in FIG. 4 is rotated clockwise relative to the second housing. As shown in FIG.

1 and FIGS. 4-5B, the oculink electronic device having a flexible circuit board 1 of the present invention may further include a first housing 7 and a second housing 8. The first housing 7 covers the first rigid circuit board 12 and the flexible circuit board 14. The oculink connector 11 is protruded from a side, which is away from the second rigid circuit board 13, of the first housing 7. The second housing 8 covers the second rigid circuit board 13, and the first housing 7 is rotatably connected with the second housing 8. In some embodiments, the second housing 8 includes a top housing 81 and a bottom housing 82. The second rigid circuit board 13 is disposed between the top housing 81 and the bottom housing 82. In other words, when the second housing 8 is going to be used to cover the second rigid circuit board 13, the top housing 81 and the bottom housing 82 are aligned and assembled to each other from the two sides (i.e. the top side and the bottom side) of the second rigid circuit board 13, so that the second rigid circuit board 13 and the electronic components or expansion device supported by the second rigid circuit board 13 are protected.

In some embodiments, the first openings 120 of the first rigid circuit board 12 and the second openings 130 of the second rigid circuit board 13 of the oculink electronic device having a flexible circuit board 1 may respectively be used to assembled and fixed with the first housing 7 and the second housing 8, or may be firstly assembled and fixed with a bendable component and then be installed in the first housing 7 and the second housing 8, but not limited herein.

In some embodiments, the first housing 7 is rotatably connected with the second housing 8. The connection position of the first housing 7 and the second housing 8 can be utilized as a rotational axle. The oculink connector 11 can be driven by the first housing 7 to rotate counter-clockwise (as shown in FIG. 5A) from the position where the first housing 7 is parallel to the second housing 8 towards the direction of the top housing 81, or can be driven by the first housing 7 to rotate clockwise (as shown in FIG. 5B) from the position where the first housing 7 is parallel to the second housing 8 towards the direction of the bottom housing 82. The maximum rotational angle in a single direction is 90 degrees. That is, the first housing 7 can be totally rotated between 180 degrees.

From the above discussion, the present invention provides an oculink electronic device having a flexible circuit board. By extending the flexible circuit board from the first rigid circuit board and the second rigid circuit board, not only the assembling steps are reduced, but also the total length is significantly shortened. The rotatable characteristic is provided, and the space requirement of installation is reduced. Meanwhile, by disposing the electronic components on the second rigid circuit board, the versatility of the existing products can be enhanced. Moreover, through the bendable component and the first housing that can be rotated relative to the second housing, the rotational function can be implemented, the internal electronic components can be effectively protected, the stability and protectivity of the product are enhanced, and the interferences between the internal electronic components and the peripheral electronic components can be avoided.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An oculink electronic device having a flexible circuit board, comprising:
    an oculink connector;
    a first rigid circuit board connected with the oculink connector, wherein the first rigid circuit board has a plurality of first openings;
    a second rigid circuit board, wherein the second rigid circuit board has a plurality of second openings;
    a bendable component, wherein the bendable component has a first connection portion, a second connection portion and a bendable portion, the first connection portion is connected with the first rigid circuit board, the second connection portion is connected with the second rigid circuit board, and the bendable portion is connected with the first connection portion and the second connection portion;
    a plurality of fixing components, wherein the fixing components are respectively penetrated through the first openings and the second openings for fixing the first rigid circuit board with the first connection portion and fixing the second rigid circuit board with the second connection portion; and
    the flexible circuit board extended from the first rigid circuit board and the second rigid circuit board and disposed between the first rigid circuit board and the second rigid circuit board.

2. The oculink electronic device having a flexible circuit board according to claim 1, wherein the first rigid circuit board is connected with the oculink connector through a terminal set.

3. The oculink electronic device having a flexible circuit board according to claim 1, wherein the bendable component is a metal plate, and the bendable portion is wavy-shaped.

4. The oculink electronic device having a flexible circuit board according to claim 1, wherein the second rigid circuit board comprises an adapter component, and the adapter component is disposed on the second rigid circuit board and connected with the oculink connector through the flexible circuit board and the first rigid circuit board.

5. The oculink electronic device having a flexible circuit board according to claim 4, wherein an expansion device is removably connected with the adapter component, and the expansion device is removably disposed on the second rigid circuit board and parallel to the second rigid circuit board.

6. The oculink electronic device having a flexible circuit board according to claim 1 further comprising a first housing and a second housing, wherein the first housing covers the first rigid circuit board and the flexible circuit board, the oculink connector is protruded from a side, which is away from the second rigid circuit board, of the first housing, the second housing covers the second rigid circuit board, and the first housing is rotatably connected with the second housing.

7. The oculink electronic device having a flexible circuit board according to claim 6, wherein the second housing comprises a top housing and a bottom housing, and the second rigid circuit board is disposed between the top housing and the bottom housing.

* * * * *